US006663487B1

(12) United States Patent
Ladner

(10) Patent No.: US 6,663,487 B1

(45) Date of Patent: Dec. 16, 2003

(54) GAMING MACHINE WITH RANDOMLY VARIABLE PAY TABLE

(76) Inventor: Desmond C. Ladner, 721 Rutit Ave., Gulfport, MS (US) 39501

(*) Notice: Subject to any disclaimer, the term of this patent is extended or adjusted under 35 U.S.C. 154(b) by 141 days.

(21) Appl. No.: 09/588,824

(22) Filed: Jun. 7, 2000

(51) Int. Cl.[7] .................... A63F 13/00

(52) U.S. Cl. .................... 463/13; 463/20; 463/25

(58) Field of Search .................... 463/16, 21, 25, 463/221 B

(56) References Cited

U.S. PATENT DOCUMENTS 5,494,287 A * 2/1996 Manz .................... 463/21
5,542,669 A * 8/1996 Charron et al. .................... 463/13
5,833,538 A * 11/1998 Weiss .................... 463/21
5,851,147 A * 12/1998 Stupak et al. .................... 463/13
5,984,779 A * 11/1999 Bridgeman et al. .................... 463/16
6,068,552 A * 5/2000 Walker et al. .................... 463/21
6,213,877 B1 * 4/2001 Walker et al. .................... 463/22
6,241,607 B1 * 6/2001 Payne et al. .................... 463/20
6,267,669 B1 * 7/2001 Luciano et al. .................... 273/269

* cited by examiner

*Primary Examiner*—John M Hotaling, II

(74) *Attorney, Agent, or Firm*—Philip J. Anderson; Anderson & Morishita, LLC

(57) ABSTRACT

An electronic gaming device and method are set forth which provides for dynamically selected pay tables. For each hand or series of hands the device selects a prevailing pay table or a prevailing pay for one or more outcomes. The prevailing pay table can be randomly selected from a plurality of pay tables, pseudo-randomly selected or can be selected based upon the player's strategy of play.

14 Claims, 2 Drawing Sheets

GAMING MACHINE WITH RANDOMLY VARIABLE PAY TABLE

FIELD OF THE INVENTION

The present invention relates to electronic wagering games commonly referred to as slot machines. More particularly, it relates to slot machines including video Poker machines, and the selection of an applicable pay table for winning combination awards.

BACKGROUND

Slot machines are well known gaming devices. These devices are embodied as electromechanical devices employing rotating reels to present outcomes or purely electronic machines using a video display (commonly referred to as "video games"). For slot machines, a player makes a wager by inputting coins or tokens or wagering accumulated credits and prompts play of the game. A processor controller, upon prompting of play, employs a random number generator (RNG) to select and outcome and controls the reels or video display to display the outcome represented by a combination of selected indicia. RNGs are well known and some gaming jurisdictions may have available, approved, RNGs for use.

In most cases, the game has a pre-determined, fixed schedule of winning outcomes and the pay out for each often referred to as the pay table. This pay table is posted so that the player can confirm winning combinations and that appropriate pay out has been made. Upon selection of the outcome, the outcome is compared to the pay table. If the selected outcome combination corresponds to a pre-determined winning outcome combination of the assigned pay table, the player is entitled to an award as dictated by the pay table. The pay outs and/or schedule of winning combinations are selected to provide pay outs to the players while garnering a profit for the machine, referred to as the hold. Based upon the statistical probabilities of each outcome occurring and the pay out for each outcome, the overall hold of the machine can be calculated. Most gaming jurisdictions require that the hold be within defined limits, such as 3%–10%.

Another type of gaming machine, generically referred to as a slot machine as well, is a video Poker machine. As is well known, these devices accept player wagers and, based upon the play by the player, produce an outcome represented by a final Poker hand combination. Like other slot machines, the final hand (or outcome) is compared to a pre-selected and fixed pay table of winning outcomes and pay outs. Video Poker pay tables are selected to provide a statistical hold within regulatory limits or as decided by the operator of the game.

Various video Poker pay tables have been adopted. When a pay table is adopted, it remains fixed for the game. On example of a pay table which has been adopted is referred to as a six-nine (because of the pay out for flushes and full houses) game and is shown in Table 1 below:

TABLE 1

(5 coins bet)

| Outcome | Pay out |
|---|---|
| Pair of jacks or Better | 5 |
| Two Pair | 10 |
| Three of a Kind | 15 |
| Straight | 25 |
| Flush | 30 |
| Full House | 45 |
| Four of a Kind | 125 |
| Straight Flush | 250 |
| Royal Flush | 4000 |

Other pay tables provide for greater pay outs for certain fours-of-a-Kind, flushes and the like, with all pay tables being fixed for the game and providing the desired hold. Thus, in some pay tables where a greater than 25:1 payout is provided for certain fours-of-a-kind, pay outs for other combinations is reduced, typically by paying only 1:1 for the more frequently obtained combination of two pair.

As stated above, the selected pay table for a machine remains fixed. Thus players often look for a desired pay table when selecting a machine to play. Recently, the trend has been for players to look for games wherein higher pay outs for fours-of-a-kind are provided.

In Stupak, U.S. Pat. No. 5,851,147 a gaming device and method is set forth where a player can select from a plurality of displayed candidate pay tables for selection for a video Poker game. Prior to play of the game, the player selects the desired pay table and pays hands according to the selected pay table until the player selects a different pay table.

There is a need for a device and method which provides a plurality of differently configured pay tables and which randomly (or pseudo-randomly) selects the pay table for each hand. Such a feature would increase the excitement and fun in playing the machine since the player may have to adopt different strategies for each hand of play according to the pay table and the player may receive, based upon the selection of the pay table, a greater reward than they would receive with other pay tables.

It would be advantageous if a device and method were provided where different pay tables are provided and are randomly (or pseudo-randomly) selected for each hand of play. Such an approach would add to the excitement of the game in that the player would not know, prior to selection of the pay, table, what the pay out will be for a winning combination. Where the pay table is selected before play in a video Poker game, the player may have to take into account the characteristics of the selected pay table in deciding the strategy of play.

It would be advantageous if a device and method were provided where some pay outs of a pre-selected pay table are randomly (or pseudo-randomly) selected for each hand of play to increase the excitement of the game.

It would be desirable also to provide such a method and device where a player has the option of selecting between two or more, undisclosed, randomly (or pseudo-randomly) selected pay tables for each hand of play.

It would further be desirable to provide a game which can determine player error in comparison to a pre-selected "ideal play" and to, based upon the calculated error select a pay table for the player to move the game's hold toward a desired level.

SUMMARY OF THE INVENTION

There is, therefore, set forth according to the present invention an electronic device and method directed to a wagering game of the type where a player makes a wager and game play indicia are selected by a data processor to result in either a winning or a losing outcome combination of indicia. If the player obtains a winning outcome, the player is issued an award according to the winning outcome combination obtained and the prevailing pay table which defines the award to be paid.

The device of the present invention includes a computer processor to control the play of the game and a display controlled by the processor to display the game play indicia. A data structure stores data corresponding to a plurality of pay tables, each pay table presenting a schedule of each game-winning outcome and a corresponding reward. The device includes, for each game played, means for selecting from the first data structure a pay table for the game and for displaying said selected pay table. Upon prompting of play of the game, the processor selects and displays an outcome for the game and compares the outcome to the selected pay table schedule of outcomes. If a game winning outcome has been selected, the device issues the reward corresponding to said selected pay table schedule.

In one embodiment, the processor randomly selects the pay table from the data sets representing the pay tables stores at the data structure. In another embodiment, the selection of each data set is weighted such that, statistically, at least one data set is more likely to be selected than another. For example, the data sets may be weighted according to a standard, bell curve, statistical, normal (Gaussian) distribution curve. The data set to be more frequently selected is weighted as the median with data sets selected to be less frequently selected are weighted less than the median data set.

In a further embodiment, the player may have the option to select between two or more, undisclosed, pay table data sets which are revealed upon selection.

In still another embodiment, the pay table is selected based upon a triggering outcome. For example, while playing under a default pay table, the player obtains a Full House, another pay table would be selected and displayed for a predetermined number of successive plays, e.g. ten. If the player does not obtain a like triggering outcome during those ten hands, the player is returned to the default pay table. If the player obtains the same triggering outcome, e.g. a Full House, the selected pay table prevails for another ten hands. If the player obtains a different, pre-selected, triggering outcome such as a four-of-a-kind, another pay table is selected to prevail for a predetermined number of plays, e.g. ten. Thus the player receives a pay table based upon obtaining triggering outcomes. For example, the triggering outcome may put the player into a more aggressive pay table so that the player can play to a pay table providing higher pays for higher ranked outcomes.

In still another embodiment, the player may be put into a different pay table based upon coin in. From a default pay table, the gaming machine counts coin in and, based upon coin in would trigger the application of another, different pay table for a predetermined number of following plays.

The method according to the present invention includes providing a memory storing a plurality of pay table data sets, each pay table data set including a schedule of designated winning outcomes and a corresponding reward, selecting for each hand a pay table data set and for any winning outcome issuing a reward corresponding to said selected pay table.

According to the various aspects of present invention, a device and method which provides for a variable selection or selection of the applicable pay table, which provides for random selection of the applicable pay table, for pseudo-random selection of the pay table and which provides for the player to select between undisclosed, selected pay tables. Still further, according to one embodiment, the processor determines player error in comparison to a pre-selected play strategy, and selects a pay table for a plurality of hands which increases the player's chances to win.

BRIEF DESCRIPTION OF THE DRAWINGS

These and other features and advantages will become appreciated as the same becomes better understood with reference to the description, claims and drawings where;

DESCRIPTION

Figure 1:
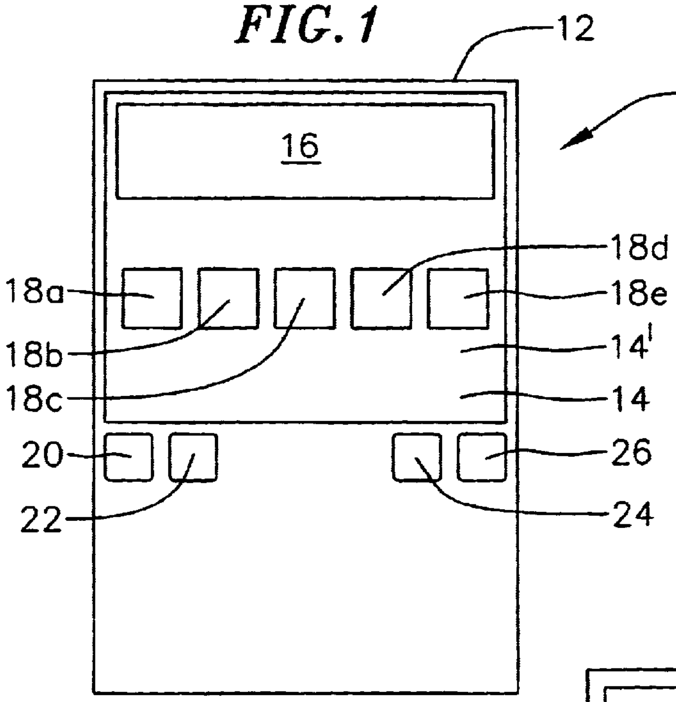
FIG. 1 illustrates a device according to the present invention.

Turning to the drawings, there is shown at FIG. 1 a device 10 according to the present invention. The device has a housing 12 containing a controller-processor (not shown) and has a video display 14. The display 14 is controlled by the processor to, present the various displays for the play of the game according to the method of the present invention. Accordingly, where the game played on the device 10 is video Poker, the display 14 displays a pay table 16 which sets forth a schedule of winning game card combinations as well as the pay off for obtaining each. A portion of the display 14 is also allocated for the display of indicia for the play of the game and the display of a final outcome. Where the device 10 is a video Poker game as illustrated, the indicia are representations of playing cards and are, as is known in the prior art, displayed at the display 14 in a row of five cards 18*a–e*.

Not shown are means for a player to input a wager. These means may be a coin acceptor, cash validator or debit/credit card reader as are known in the art. The wager input means communicates with the processor to register the amount of the wager and, if a maximum wager is made, prompt play of the game.

To control the play of the game the usual and accepted control buttons are provided. These buttons include a cash out button 20 which the player depresses to control the processor to dispense coins/tokens to cash the player out of the device 10. A bet 1 unit button 22 permits the player to wager one token or unit at a time and a max bet button 24 permits the player to wager the maximum permitted by the device 10. When a maximum bet is made, play of the game is automatically prompted. When less than the maximum is wagered, a deal button 26 is depressed to prompt play.

The various control buttons for the player to control the play of the device 10 may be incorporated into a touch screen display 14' if desired.

To play the device 10, where the game is video Poker, the player inputs a wager, a single unit up to the maximum, and prompts play of the game. When play is prompted, the processor randomly selects from a universe of data representing each card of a deck of cards, an initial hand of five cards 18*a–e* and displays at the display 14 the values, i.e. faces, of the cards 18*a–e* of the initial hand. The player, using selection buttons (not shown) or the touch screen display 14', selects which of the cards 18*a–e* of the initial hand to discard. Any cards 18*a–e* selected for discarding are replaced by cards selected by the processor to produce a final hand outcome.

The card combination of the final hand outcome is compared to a schedule of winning outcomes and rewards referred to herein as the pay table. If the player has obtained a winning outcome, the processor issues the reward to the player based upon the player's wager and the pay table schedule.

The pay table for the game, according to the prior art, remains static and fixed for the play of all hands. For the player to have a different prevailing pay table, they must change games by moving to a different machine or changing games on the existing machines where the processor stores multiple games.

Examples of some accepted pay tables for video Poker machines are shown in the following tables:

TABLE 1

| (5 coins bet) | |
|---|---|
| Outcome | Pay out |
| Royal Flush | 4000 |
| Straight Flush | 250 |
| Four of a Kind | 125 |
| Full House | 45 |
| Flush | 30 |
| Straight | 25 |
| Three of a Kind | 15 |
| Two Pair | 10 |
| Pair of Jacks or Better | 5 |

TABLE 2

| (5 coins bet) | |
|---|---|
| Royal Flush | 4000 |
| Straight Flush | 250 |
| Four of a Kind | 400 |
| Full House | 40 |
| Flush | 35 |
| Straight | 25 |
| Three of a Kind | 15 |
| Two Pair | 5 |
| Pair of Jacks or Better | 5 |

TABLE 3

| (5 coins bet) | |
|---|---|
| Royal Flush | 4000 |
| Straight Flush | 250 |
| Four Aces/w2,3,4 | 1000 |
| FourAces | 800 |
| Four 2s,3s,4s/w2,3,4 | 800 |
| Four 2s,3s,4s | 400 |
| Four 5-King | 250 |
| Full House | 35 |
| Flush | 30 |
| Straight | 25 |
| Three of a Kind | 15 |
| Two Pair | 5 |
| Pair of Jacks or Better | 5 |

TABLE 4

| (5 coins bet) | |
|---|---|
| Royal Flush | 4000 |
| Straight Flush | 250 |
| FourAces | 400 |
| Four 2s,3s,4s | 200 |
| Four 5-King | 125 |
| Full House | 35 |
| Flush | 30 |
| Straight | 25 |
| Three of a Kind | 15 |
| Two Pair | 5 |
| Pair of Jacks or Better | 5 |

It should be understood that other pay tables exist and can be created and can be incorporated into the device 10 and method of the present invention. Further, the present invention could incorporate Deuces Wild pay tables, Joker's Wild pay tables and others as well.

According to the device 10 and method of the present invention, the field of desirable pay tables are stored in a data structure (e.g. data storage device such as a ROM, CD-Rom) as data sets assigned at a discrete addresses. Prior to the play of each hand, a pay table is selected from the stored field and is displayed as the pay table 16 at the display 14. The selected pay table 16 sets forth the schedule of winning outcome combinations and the corresponding pay outs for each. The processor then selects and displays the cards 18*a–e* and the player plays the video Poker hand by selecting discards, if any, to produce a final outcome, i.e. a final, five card, Poker hand. The processor compares the final outcome to the schedule of winning outcome hands of the selected, prevailing pay table. If the player has obtained a winning outcome, he receives a pay out as dictated by the selected pay table.

After the hand has been completed, a new wager is made and the prevailing pay table is selected.

Various means can be used to select the prevailing pay table for the hand. One means is for the processor, using a random number generator (RNG) to randomly select from the stored pay table data sets, the prevailing pay table for that hand. Thus each pay table would have the same statistical probability of being selected.

Figure 4:
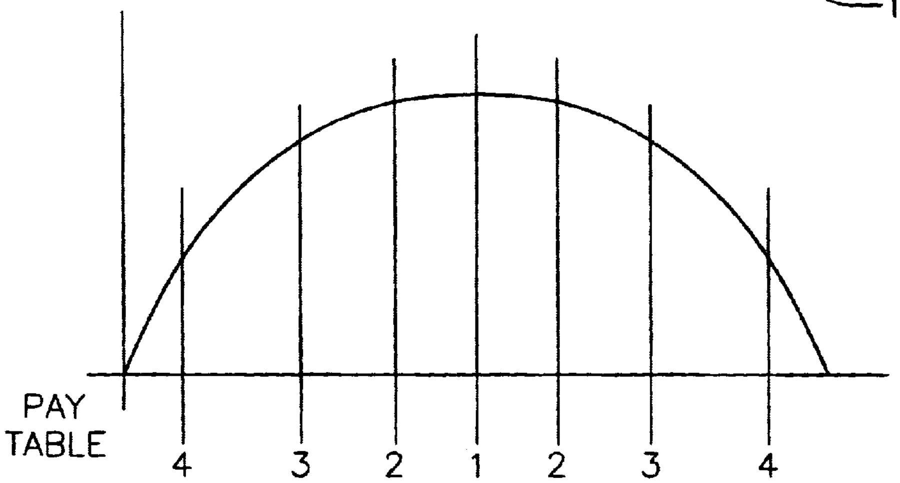
FIG. 4 shows one method for weighting the selection of pat tables.

Another means by which the prevailing pay table may be selected is to provide a pseudo random selection by weighting certain pay tables. With reference to FIG. 4, one such pseudo-random selection means includes using a Gaussian distribution curve (bell curve) approach and selecting the pay table which statistically should be selected more frequently, to the center or of the curve. Thus, for example, the pay table of Table 1, may occupy the center position and thus be statistically more likely than other pay tables to be selected. This weighting in regards to the selection of the pay tables may be accomplished by data mapping, i.e. mapping a number selected by the RNG to a Gaussian-like map for the data addresses, by duplicating pay tables at different addresses, the number of duplications matching a desired distribution scheme, or by any other suitable means. It should also be understood in regards to weighting, that any desirable weighting for the selection of pay tables could be used such as a linear distribution, weighting only one or several pay tables differently, or the like.

Thus, with reference to FIG. 4, it is more like that a pay table according to Table 1 would be selected, however, other pay tables will be selected such that, over a population of random selections, statistically each pay table would be selected according to the curve.

Figure 3:
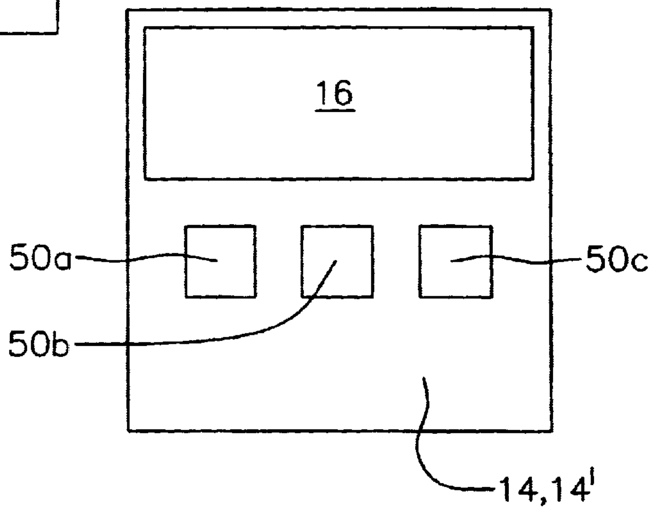
FIG.3 shows a display for play according to another aspect of the present invention.

While the processor may simple select and display the prevailing pay table, in a further embodiment of the present invention as shown in FIG. 3, the processor may select a plurality of undisclosed pay tables from which the player makes a selection. For example, upon prompting of play the backs of three playing cards 50*a–c* may be displayed. Each playing card back represents a selected but undisclosed pay table. The player touches one of the card 50*a–c* backs and thereby selects the prevailing pay table. This feature adds to the excitement of the game in that the player feels they have a degree of control over the selection of the pay table.

As stated above, in the preferred embodiment, the prevailing pay table is selected before the play of each hand. However, according to another embodiment, the pay table or at least the rewards, may be selected after the play of the hand.

Furthermore, the method and device according to the present invention, rather than providing as data sets complete pay tables, the data sets may only have differing pay outs for certain outcomes, e.g. certain fours of a kind. Thus, each prevailing pay table may have a static component such as the rewards for three of a kind, straights, flushes, straight flushes, and a volatile component such as the pays for Royal Flushes, certain fours of a kind or the like.

Figure 2:
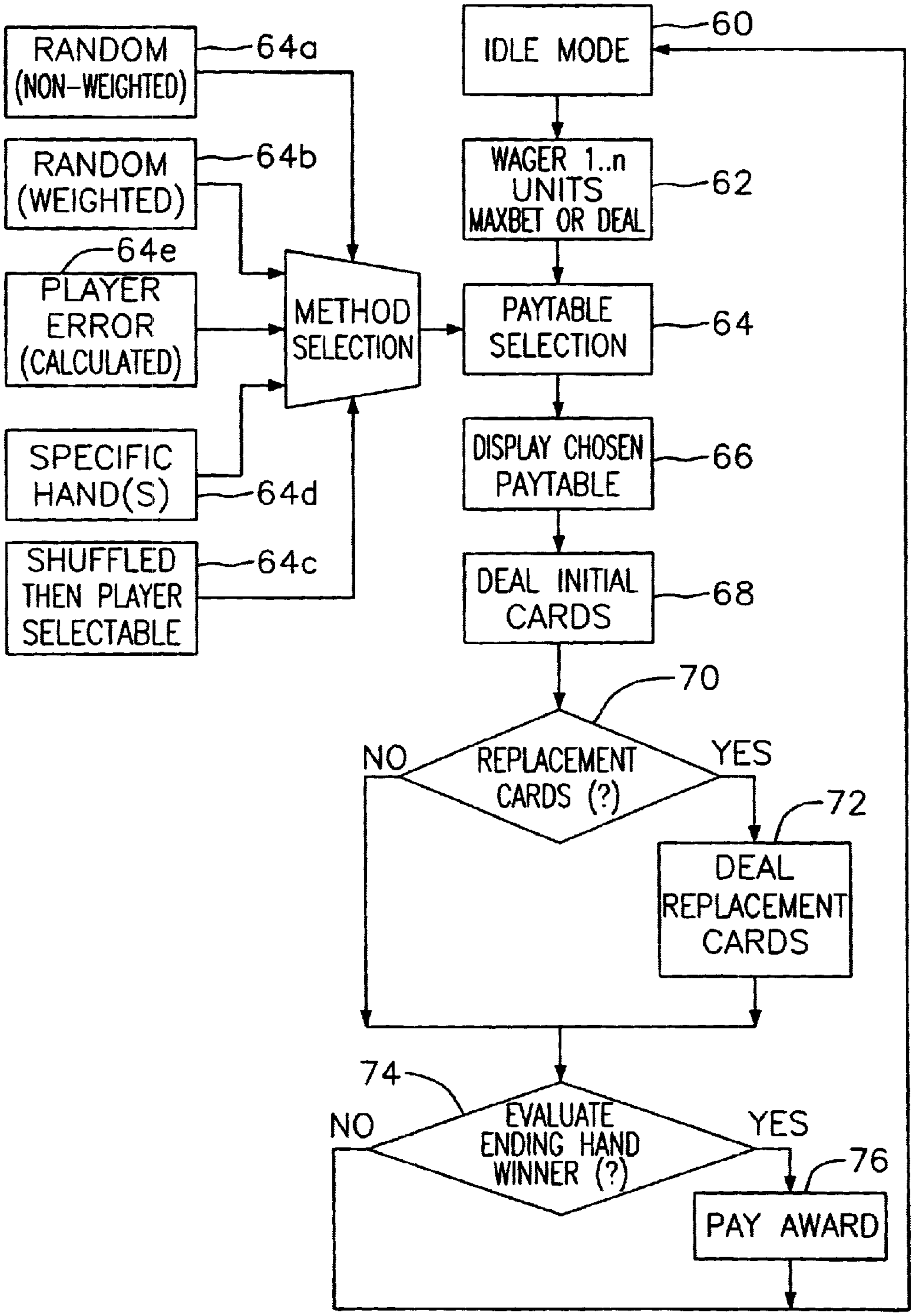
FIG. 2 is a logic diagram concerning the play of a game according to the present invention.

With reference to FIG. 2, a logic diagram for the device 10 and method of the present invention is shown. At 60 the device 10 is in an idle mode and at 62 the player inputs a wager and prompts play of the device 10. The processor at 64 selects the pay table according to any one of the above techniques including at 64*a*, a random selection, at 64*b* a weighted selection, at 64*c* selection including player selection such as described with reference to FIG. 3, or at 64*d* selecting a pay for certain, selected combinations.

According to yet a further embodiment, the processor may monitor over a series of hands the player's play in comparison to one or more pre-determined strategies for play. An example would be where the player always holds two pair. The processor would, based upon this recognized strategy, would be programmed to select for the player, for example, a Table 1 pay table which provides for a 2:1 pay for two pair. The processor would monitor play and when determined may select another pay table. As another example, if the player is obtaining fours of a kind frequently, the processor may select a pay table which has a higher pay for fours of a kind.

Thus, with reference to FIG. 2 at 64*e* player error is calculated and the most beneficial pay table is selected. The processor at 66 displays the selected pay table 16 at the device 10 and at 68 the processor deals the initial cards for the play of the hand. At 70 the player decides whether to discard cards and if so at 72 replacement cards are dealt to result in the final outcome of a five-card Poker hand. At 74 the processor compares the final outcome to the schedule of winning hands set forth in the selected pay table and, if a winning outcome has been obtained, at 76 issues the corresponding award as dictated by the pay table.

To play the next hand, another wager is made and the pay table is selected.

According to another embodiment, the processor 66 operates under a default pay table, e.g. Table 1 until the player obtains a preselected, triggering outcome or one of a plurality of triggering outcomes. As but an example if, while playing under the default pay table, the player obtains a Full House, the processor 66 would select a Table 2 pay table to apply to, for example, the next following ten plays. If the player does not obtain a Full House or better during the next ten plays, the processor 66 returns the player to the default pay table. If the player obtains another Full House during those next ten plays, the Table 2 pay table would apply for the next ten hands. If during the ten hand play sequence, the player obtains a different pay table triggering outcome, e.g. a four-of-a-kind, the processor 66 would apply, for example a Table 3 pay table for the next ten plays. If the player does not obtain another four-of-a-kind during those next ten plays, the processor returns the [player to the default pay table or to another pay table, e.g. to the Table 2 pay table for another ten plays. This sequence of using triggering outcomes continues during play selecting prevailing pay tables and/or returning the player to the default pay table.

In still another embodiment, the processor 66 monitors the coin in (wagers made). After a preselected amount has been wagered under a pay table, e.g. Table 1, the processor 66 would apply a different pay table, e.g. Table 2, for a preselected number of plays or coin in. The processor 66 may then return the player to the default pay table or may select another pay table, randomly or pseud-randomly to apply for the next following coin in or number of plays.

While the description above has been directed to video Poker games, it should be understood that the method and device could also be employed for other slot machine games, such as the video slot machines depicting reels with indicia spinning to select and outcome and games such as multi-hand video Poker games such as are embodied in U.S. Pat. No. 5,823,873 titled "Method of Playing Electronic Video Poker Games" issued Oct. 20, 1998 to Moody wherein, for each hand, a different and prevailing pay table may be selected.

While I have shown and described certain embodiments of the present invention, it is to be understood that it is subject to many modifications and changes without departing from the spirit and scope of the appended claims.

I claim:

1. An electronic device for playing a wagering game of the type where a player makes a wager, game play indicia are selected by a data processor to result in either a winning or a losing outcome combination of indicia and, if the player obtains a winning outcome, the player is issued an award according to the winning outcome combination obtained and a pay table which defines the award to be paid, the device comprising:

a processor to control the play of the game;

a display to display the game play indicia, said display controlled by the processor;

means for the player to input a wager and prompt play of the game;

a data structure storing data corresponding to a plurality of pay tables, each pay table presenting a differing award schedule for at least some game-winning outcomes;

the processor configured to randomly select from the first data structure a pay table for the game and to control the display to display the selected pay table;

the processor configured to, upon prompting of play of the game, select and display an outcome for the game and compare the outcome to the selected pay table award schedule and if a game winning outcome has been selected, for issuing the reward corresponding to said selected pay table schedule.

2. The device of claim 1 comprising player pay table selection means including said processor preprogrammed to (i) select from said data structure at least two undisclosed pay table schedules and to control the display to display at least two pay table selection indicia, each representing a selected pay table and (iii) means for the player to select a pay table selection indicia, said processor in response to said selection selecting and displaying the corresponding pay table schedule.

3. An electronic device for playing a wagering game of the type where a player makes a wager, game play indicia are selected by a data processor to result in either a winning or a losing outcome combination of indicia and, if the player obtains a winning outcome, the player is issued an award according to the winning outcome combination obtained and a pay table which defines each award to be paid, the device comprising:

a processor to control the play of the game;

a display to display the game play indicia and a pay table, said display controlled by the processor;

means for the player to input a wager and prompt play of the game;

a data structure storing data corresponding to a plurality of pay tables, each pay table presenting a different schedule of game-winning outcomes and a corresponding rewards;

said processor configured to randomly-select from the first data structure a pay table for the game and display the same at said display;

said processor configured to, upon input of a wager and prompting of play of the game, select and display an outcome for the game and compare the outcome to the selected pay table and, if a game winning outcome has been selected, issue the corresponding reward.

4. The device of claim 3 including means for selecting the pay table on a weighted random basis.

5. The device of claim 3 comprising said processor configured to select the pay table on a weighted random basis.

6. The device of claim 3 comprising said processor configured to select the pay table based upon a Gaussian distribution for said pay table data.

7. The device of claim 3 comprising said processor configured to display and apply a default pay table and to store data representing a plurality of triggering outcomes, said processor configured to, in response to a triggering outcome, select and display data representing another pay table for at least the next game.

8. The device of claim 7 comprising said processor configured to apply said selected and displayed another pay table for a predetermined number of subsequent games.

9. The device of claim 3 comprising said processor configured to display and apply a default pay table and to store data representing a plurality of triggering outcomes, said processor further configured to, in response to each triggering outcome, select, display and apply data representing another, different, pay table for at least the next game.

10. The device of claim 3 comprising said processor configured to detect the amount wagered over a plurality of games and in response to wagering of a predetermined amount, select, display and apply data representing a different pay table.

11. The device of claim 3 comprising a data structure storing data representing a game play strategy, said processor configured to compare the game play decisions of the player over a set of preceding games to the data representing the game play strategy and based upon said comparison, select said pay table.

12. A method for playing an electronic wagering game of the type including the player making a wager to play a hand, a processor selecting and displaying an outcome, designating certain outcomes as winning outcomes and rewarding the player for obtaining a winning outcome, the improvement comprising:

providing a memory storing a plurality of pay table data sets, each pay table data set including a different schedule of designated winning outcomes and corresponding rewards;

said processor randomly selecting from said pay table data sets a pay table to apply the game hand;

displaying the selectee pay table; and for any winning outcome issuing a reward corresponding to said selected pay table.

13. The method of claim 12 comprising storing said pay table data sets such that at least one set has a greater probability of being selected in comparison to at one other pay table set.

14. The method of claim 13 comprising storing said pay table data sets according to a Gaussian probability distribution.

* * * * *